Dec. 10, 1929.   W. RECHT   1,738,612
METHOD OF AND APPARATUS FOR MAKING BOTTLE SEALS
Filed Nov. 23, 1929
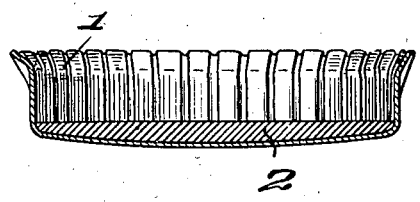
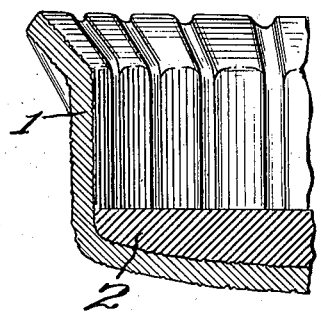
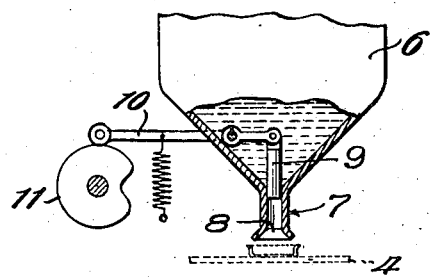
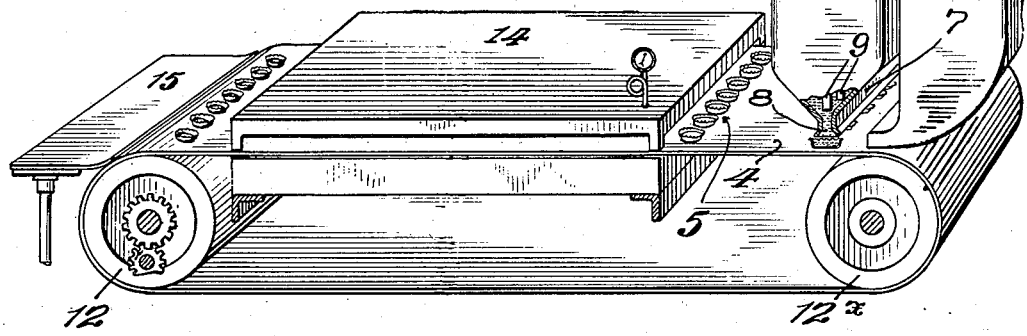
INVENTOR
William Recht
BY
ATTORNEY Patented Dec. 10, 1929

1,738,612

UNITED STATES PATENT OFFICE

WILLIAM RECHT, OF NEW YORK, N. Y.

METHOD OF AND APPARATUS FOR MAKING BOTTLE SEALS

Application filed November 23, 1928. Serial No. 321,346.

The object of the present invention is to provide a method of and apparatus for making a seal, known in the trade as a "crown" seal or cap for bottles, having a novel form as to the combination of the rigid metallic and flexible sealing members. In such devices the sealing member has for many years customarily been made of either a solid disk of cork or disk of cemented ground cork. Throughout this period efforts have been made in the art to provide a more effective seal, inasmuch as the handling thereof by the necessary mechanical elements causes chipping and fissures in the cork seal, causing leakage of gas or of the liquid from the bottle. Another defect of the cork sealing member is that carbonic acid gas, and acid in fruit flavored and other liquids darkens the cork and renders it objectionable in appearance, requiring the use of protecting foil. To avoid these disadvantages it has been proposed to substitute rubber and other plastic disks for the cork. Thus in the patent to McManus, No. 1,588,250 of June 8, 1926, it is proposed to employ a vulcanized rubber sealing member forced by dies into the metallic cap, this being an attempt to improve upon a similar disclosure in a patent to Taliaferro, No. 1,425,349 of August 8, 1922. Such attempted improvements upon the form of crown seal have not, so far as applicant is informed, been commercially adopted for the reasons that it is necessary first to mold the rubber disk, then place it within the cap, then press the disk into close contact with the cap and into the shape required, by means of dies. Before the die operation it is necessary to prepare the disk for adhesion to the cap either by applying cement or by heating. The cost of the rubber disk is greater than that of the cork disk and the handling operations so increase the cost that the practice is not commercial.

By my invention I am enabled to produce a bottle closure of the crown type which is far superior as to sealing properties than either the cork or applied rubber disk caps, and one in which the cost of manufacture is very much less than either of the aforesaid earlier types, manufacture of the disk, assembly in the cap and adhesion to the cap, all being performed in a single simple operation, and the adhesion of the seal to the cap being such that the two are practically an integral unit, a combination which never has existed heretofore in such devices.

The invention will be described with reference to the accompanying drawing in which—

Figure 1 is a cross section of a device constructed in accordance with the invention, and Figure 2 is a magnified and fragmental sectional view of the same;

Figure 3 is a perspective view of an apparatus constructed in accordance with the invention, and Figure 4 is a fragmentary view of the hopper in end elevation, the hopper being partly broken away, and showing also a nozzle controlling plunger and operating means therefor.

Referring to Figure 1 it will be seen that the general superficial appearance of the seal is that of a crown cap with a rubber sealing disk. The cap member is indicated at 1 and the sealing member at 2. The cap is of usual construction with a slightly dished top and an annular flange, as shown in Figs. 1 and 2. In practice, the cap is used with a bottle having its neck beaded at the top and the annular flange of the cap contacts with and surrounds the bead. Referring to Figure 2, however, the differences between the seal and those customarily made become apparent. It will be noted that the cap, being of metal and formed by the rapid action of a die, has surface irregularities and "pores". The seal penetrates the most minute of the pores, and irrespective of the irregularity of the bottom and side walls of the cap, due to the tendency of the metal to "spring back" after it leaves the die, the surface of the seal is without undulations, being perfectly plane. Thus the top of the cap is slightly bowed or bulged, as frequently is the case. The thickness of the seal varies along the diametrical line compensating for such irregularity and maintaining the plane surface of the seal. Such a structure is not obtained with an applied rubber disk, even when die pressure is applied to the disk. The die will temporarily flatten out the cap, but the spring of the metal will cause the cap to approximate its original form thereby drawing the sealing disk with it into irregularity.

As a material for my sealing member I prefer a vulcanizable rubber compound in liquid form. Such compounds are well known in the rubber industry, being used for many purposes and do not require specification as to constituents. I do not limit myself to rubber, however.

In Figures 3 and 4 I have illustrated an apparatus capable of carrying the invention into effect. 3 indicates a hopper or other means for applying the crown disks to an endless belt 4 in such manner that the disks are placed in successive rows, as is indicated at 5. 6 is a tank for the rubber compound, the compound flowing to a manifold 7 having a plurality of nozzles 8 corresponding to the number of caps in each roll on the endless belt 4. Each nozzle is controlled by a plunger 9 actuated by a lever 10, the movement of which is controlled by cam 11. The endless belt is led over drums 12, 12$^x$ and these drums are driven intermittently so that a row of caps is brought under the nozzles 8 and then held motionless during an upward movement of the plungers to cause the liquid rubber compound to flow into the nozzle where its flow is accelerated, its volume controlled and the nozzle closed by downward movement of each plunger 9. The intermittent driving of the drums is effected by the use of a mutilated gear wheel, as illustrated in the drawings, intermediate the source of power and a gear on a drum shaft, or by any other suitable means. By reference to Figs. 1 and 2, it will be noted that the volume of the rubber compound indicated at 2 caused to flow into the cap is such that its upper surface assumes a level a substantial distance below the periphery of the flange of the cap. The rubber compound is discharged into the cap at its base and spreads out and assumes a level without contact with the inner wall of the flange except at and below the level substantially as shown in Figs. 1 and 2. The plungers now remain in lower position, closing the nozzles, until a second row of caps is brought into position for receiving the liquid compound. In its intermittent movement in the direction of the arrow the belt 4 is carried within the vulcanizing chamber 14 which will be provided with a heating element for effecting the vulcanization of the rubber compound to the caps. The chamber will be constructed as to length in accordance with the speed of movement of the belt and the temperature created by the heating element. The completed and vulcanized caps will pass from the belt into a reception table 15 for packing.

Having described my invention what I claim and desire to secure by Letters Patent is as follows:—

1. In apparatus of the character described, a plurality of discharge members for a liquid adapted to form a yielding bottle sealing medium, means for feeding, step by step, successive metallic caps into and out of register with said discharge members, and means for controlling the flow of liquid from said discharge members to permit treated caps to be withdrawn and untreated caps to be passed into register with said discharge member.

2. A method of forming bottle seals which consists in the submission of metallic flanged caps to flow therein of a viscous material capable of conversion into a resilient body, while supporting the caps in horizontal position and flowing the viscous material without contact with the inner walls of the flanges except at and below a level confined in position to a substantial distance below the periphery of each flange and converting said viscous material into a solid while the caps are held in substantially horizontal position, so that the resilient body has one face bonded to the cap, and a second plane exposed face.

In testimony whereof, I have hereunto signed my name to this specification.

WILLIAM RECHT.